US009994427B2

(12) United States Patent
Gonzalez Alemany et al.

(10) Patent No.: US 9,994,427 B2
(45) Date of Patent: Jun. 12, 2018

(54) SAFETY CHAIN FOR PALLETS FOR CONVEYORS USED TO TRANSPORT PEOPLE AND GOODS

(71) Applicant: THYSSENKRUPP ELEVATOR INNOVATION CENTER S.A., Gijon (ES)

(72) Inventors: Miguel Angel Gonzalez Alemany, Oviedo (ES); Juan Domingo Gonzalez Pantiga, Gijon (ES); José Mendiolagoitia Juliana, Gijon (ES); Francisco Palomero Cocho, Gijon (ES); Aurelio Castaño Lantero, Langreo (ES); Eduardo Moran Garcia, Gijon (ES); Pedro Ros Zuazua, Oviedo (ES)

(73) Assignee: THYSSENKRUPP ELEVATOR INNOVATION CENTER S.A., Gijon (ES)

( * ) Notice: Subject to any disclaimer, the term of this patent is extended or adjusted under 35 U.S.C. 154(b) by 0 days. days.

(21) Appl. No.: 14/907,485

(22) PCT Filed: Jun. 11, 2014

(86) PCT No.: PCT/ES2014/070481
§ 371 (c)(1),
(2) Date: Jan. 25, 2016

(87) PCT Pub. No.: WO2015/011313
PCT Pub. Date: Jan. 29, 2015

(65) Prior Publication Data
US 2016/0176680 A1 Jun. 23, 2016

(30) Foreign Application Priority Data
Jul. 25, 2013 (ES) .................................. 201331142

(51) Int. Cl.
*B65G 17/06* (2006.01)
*B66B 21/12* (2006.01)
*B66B 23/02* (2006.01)

(52) U.S. Cl.
CPC ............ *B66B 21/12* (2013.01); *B66B 23/024* (2013.01)

(58) Field of Classification Search
CPC ...... B65G 17/08; B65G 17/066; B66B 23/12; B66B 23/14; B66B 21/04
(Continued)

(56) References Cited

U.S. PATENT DOCUMENTS 3,516,363 A 6/1970 Van Der Wal
3,834,520 A 9/1974 Patin
(Continued)

FOREIGN PATENT DOCUMENTS

EP 1331196 A2 7/2003
ES 2179720 A1 1/2003
(Continued)

OTHER PUBLICATIONS

English Translation of International Search Report for PCT/ES2014/070481 dated Oct. 2, 2014 (dated Oct. 9, 2014).
English Translation of Abstract from ES2289955A1.

*Primary Examiner* — Gene O Crawford
*Assistant Examiner* — Lester Ill Rushin
(74) *Attorney, Agent, or Firm* — thyssenkrupp North America, Inc.

(57) ABSTRACT

A safety chain for conveyor pallets may comprise bent links arranged in alternating fashion with straight links. Each of the bent links may have two ends with a wheel disposed at each end. Each consecutive bent link and straight link may be joined at an articulation point. The safety chain may also comprise arms extending from each articulation point, wherein a conveyor pallet may be coupled to each arm. Further, roller guides that follow a trajectory of the safety chain may be arranged on one of two sides of the safety chain. The roller guides may rotate the wheels of the bent
(Continued)

links. The articulation points enable rotation and position change of the bent links and the straight links so as to increase or decrease a distance between consecutive conveyor pallets according to a change of speed of a conveyor.

17 Claims, 7 Drawing Sheets

(58) Field of Classification Search
USPC ................................ 198/321, 326, 333, 850
See application file for complete search history.

(56) References Cited

U.S. PATENT DOCUMENTS

| | | | | |
|---|---|---|---|---|
| 3,939,959 | A | 2/1976 | Dunstan et al. | |
| 4,073,016 | A * | 2/1978 | Koll | A61G 7/1032 5/81.1 C |
| 4,413,721 | A * | 11/1983 | Bollier | B65G 47/96 198/370.03 |
| 5,115,899 | A | 5/1992 | Nakatani | |
| 6,588,573 | B1 | 7/2003 | Ogura et al. | |
| 6,591,959 | B1 * | 7/2003 | Ogura | B66B 21/025 198/334 |
| 6,675,949 | B1 * | 1/2004 | Gonzalez Alemany | B66B 21/12 198/334 |

FOREIGN PATENT DOCUMENTS

| | | | |
|---|---|---|---|
| ES | 2289955 | A1 | 2/2008 |
| ES | 2401206 | A1 | 4/2013 |
| GB | 1383785 | A | 2/1974 |
| GB | 2264686 | A | 9/1993 |

* cited by examiner

SAFETY CHAIN FOR PALLETS FOR CONVEYORS USED TO TRANSPORT PEOPLE AND GOODS

CROSS REFERENCE TO RELATED APPLICATIONS

This application is a U.S. National Stage Entry of International Patent Application Serial Number PCT/ES2014/070481, filed Jun. 11, 2014, which claims priority to Spanish Patent Application No. ES P201331142 filed Jul. 25, 2013, the entire contents of both of which are incorporated herein by reference.

FIELD

The present disclosure relates to conveyors used to transport people and goods and, more particularly, to mechanisms that enable such conveyors to vary speed.

BACKGROUND

Currently, conveyors (or, in the alternative, 'aisles') that enable the distance between pallets and different degrees of overlap between the same to be varied exist, such as the one described in document U.S. Pat. No. 3,939,959, wherein each pallet has a number of trackers that by means of a chain or cable mechanism, copy a certain trajectory in the acceleration and deceleration areas, thus enabling the relative movement of the pallets.

Additionally, other means for varying the distance between pallets exist, such as the one described in document ES2289955B1. In this case, a variable acceleration pitch screw is used, which varies the relative position of the pallets in the transition area between the low speed loading area and the high speed central area and in the same way, a variable deceleration pitch screw for reducing the speed between the maximum speed central area and the unloading area, which is low speed.

These aisles described in the state of the art enable the same to operate with changes in speed, increasing and decreasing the distance between pallets Nevertheless, they need very complex speed variation mechanisms, which complicate and raise the manufacture and maintenance costs of the aisles.

Therefore, there is a need for a system that efficiently enables an increase and decrease in the distance between pallets and the overlap between them, according to the change in the speed of the conveyor.

DETAILED DESCRIPTION

Figure 1:
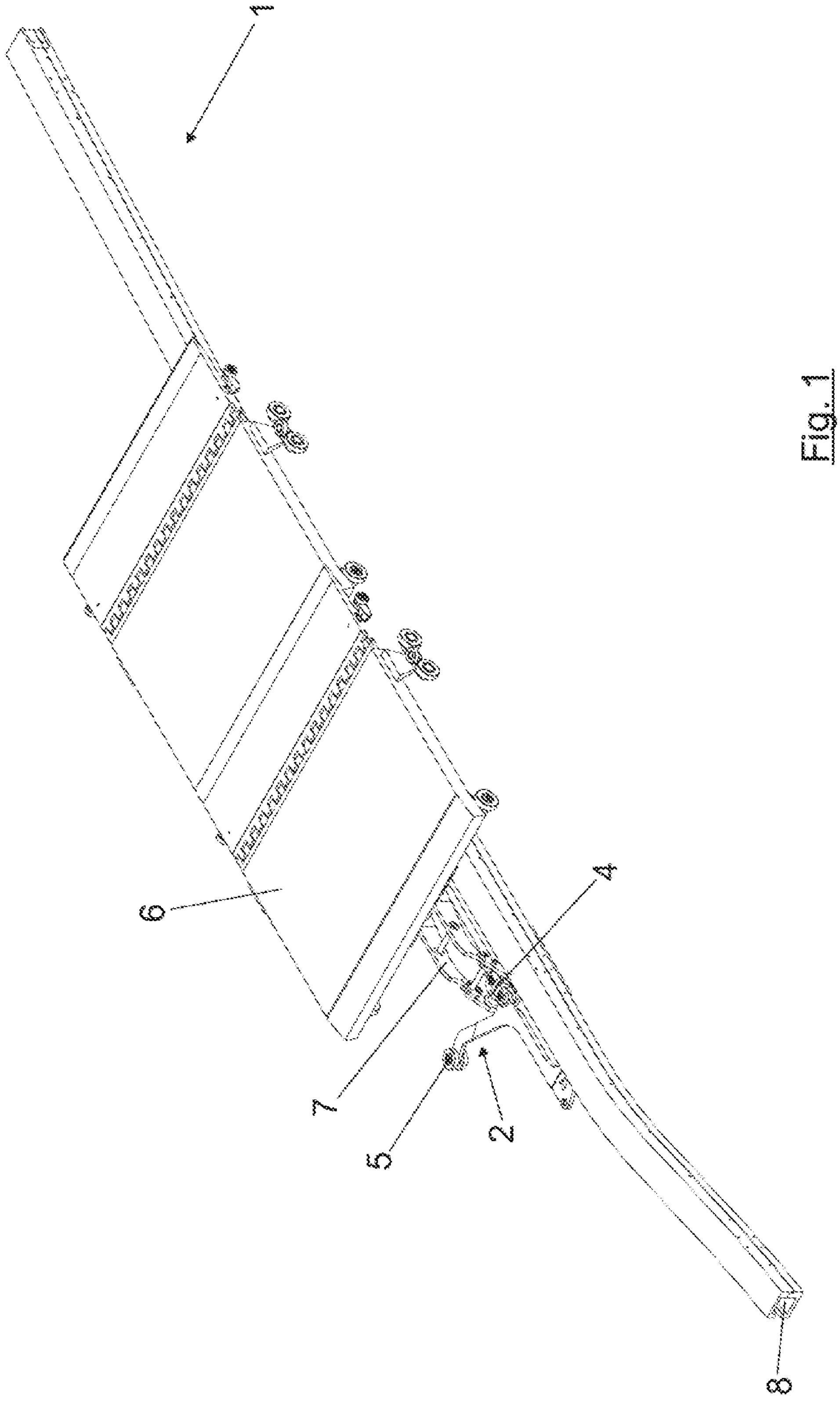
FIG. 1 is a perspective view of an example chain arranged in an example conveyor, with example links of the chain being positioned for maximum distance or minimum overlap between example pallets.
Figure 2:
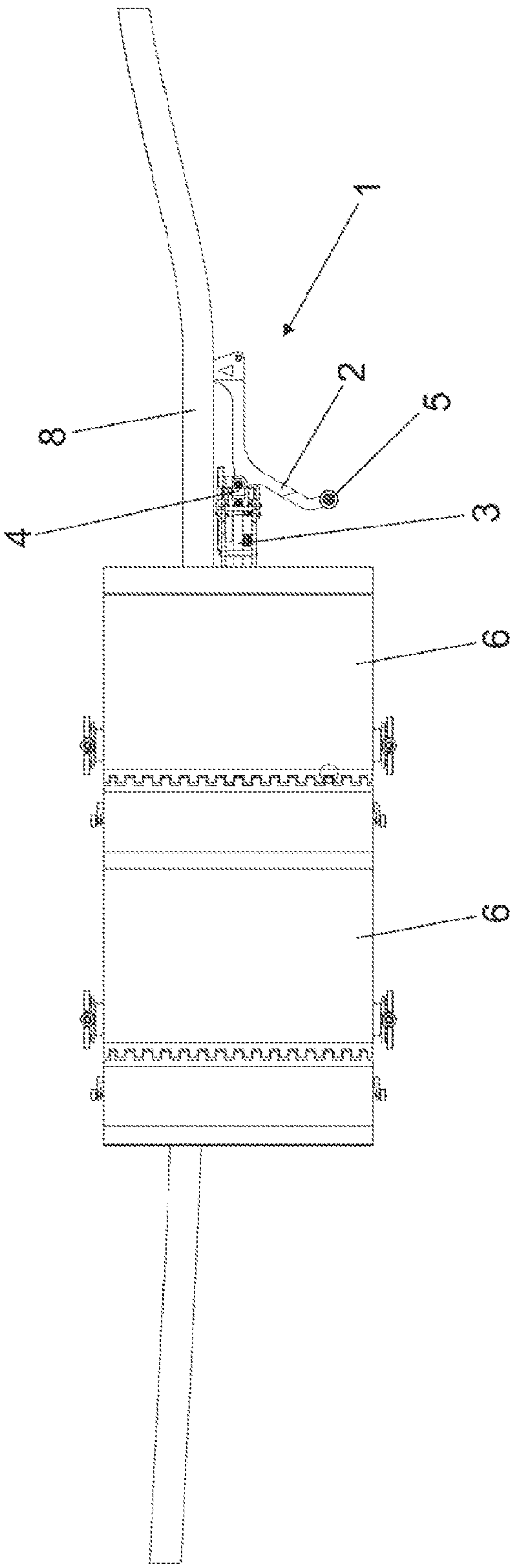
FIG. 2 is a plan view of the example chain and the example conveyor of FIG. 1.
Figure 3:
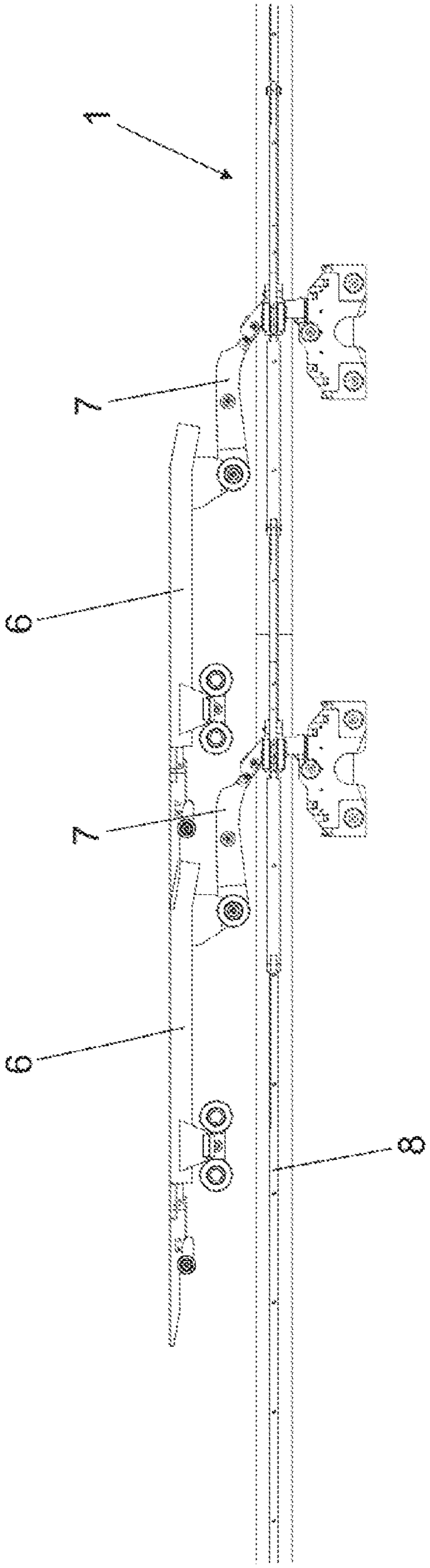
FIG. 3 is a profile view of the example chain and the example conveyor of FIGS. 1-2.
Figure 4:
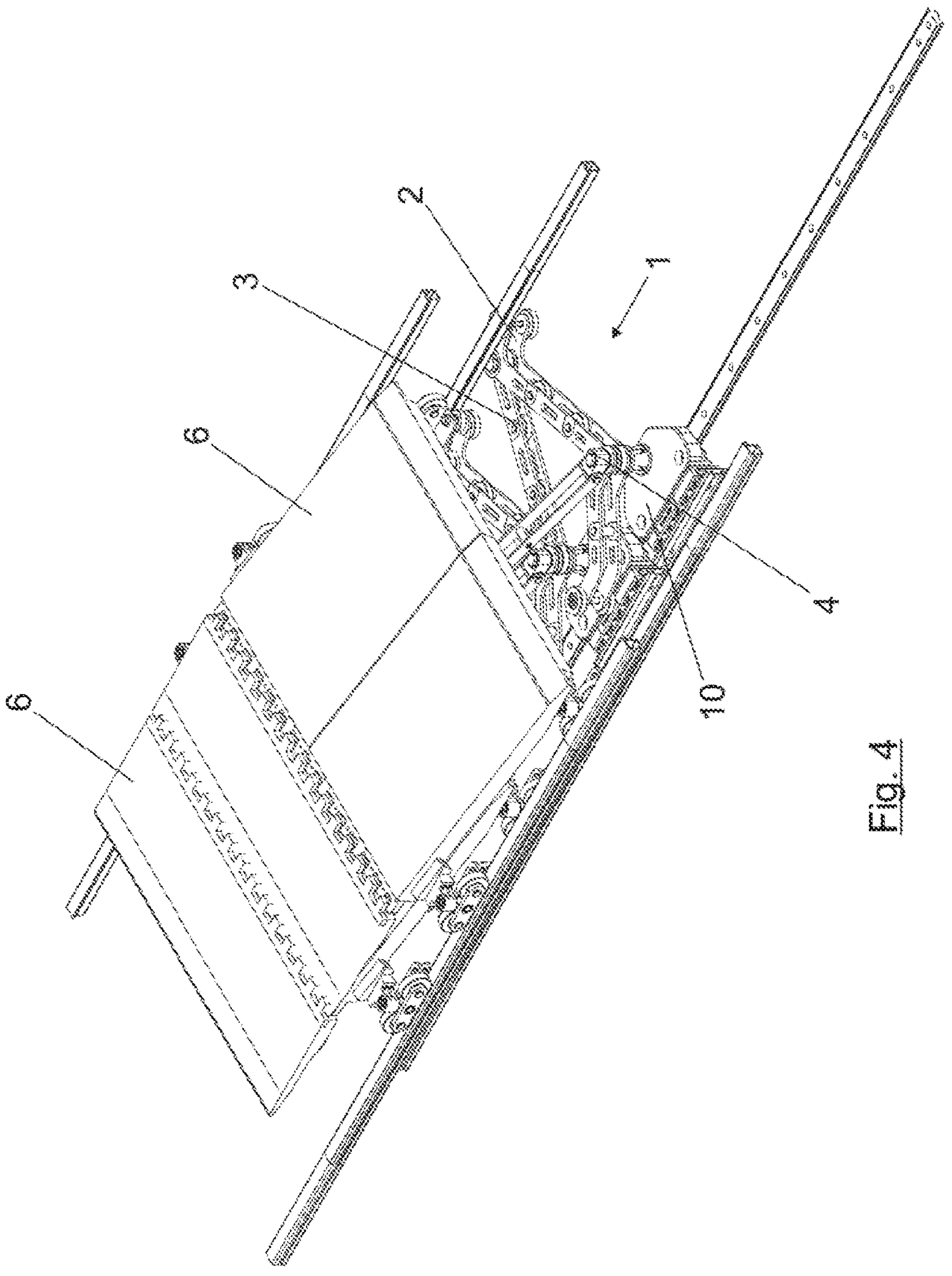
FIG. 4 is a perspective view of an example chain arranged in an example conveyor in an event where the chain is actuated by a sprocket.
Figure 5:
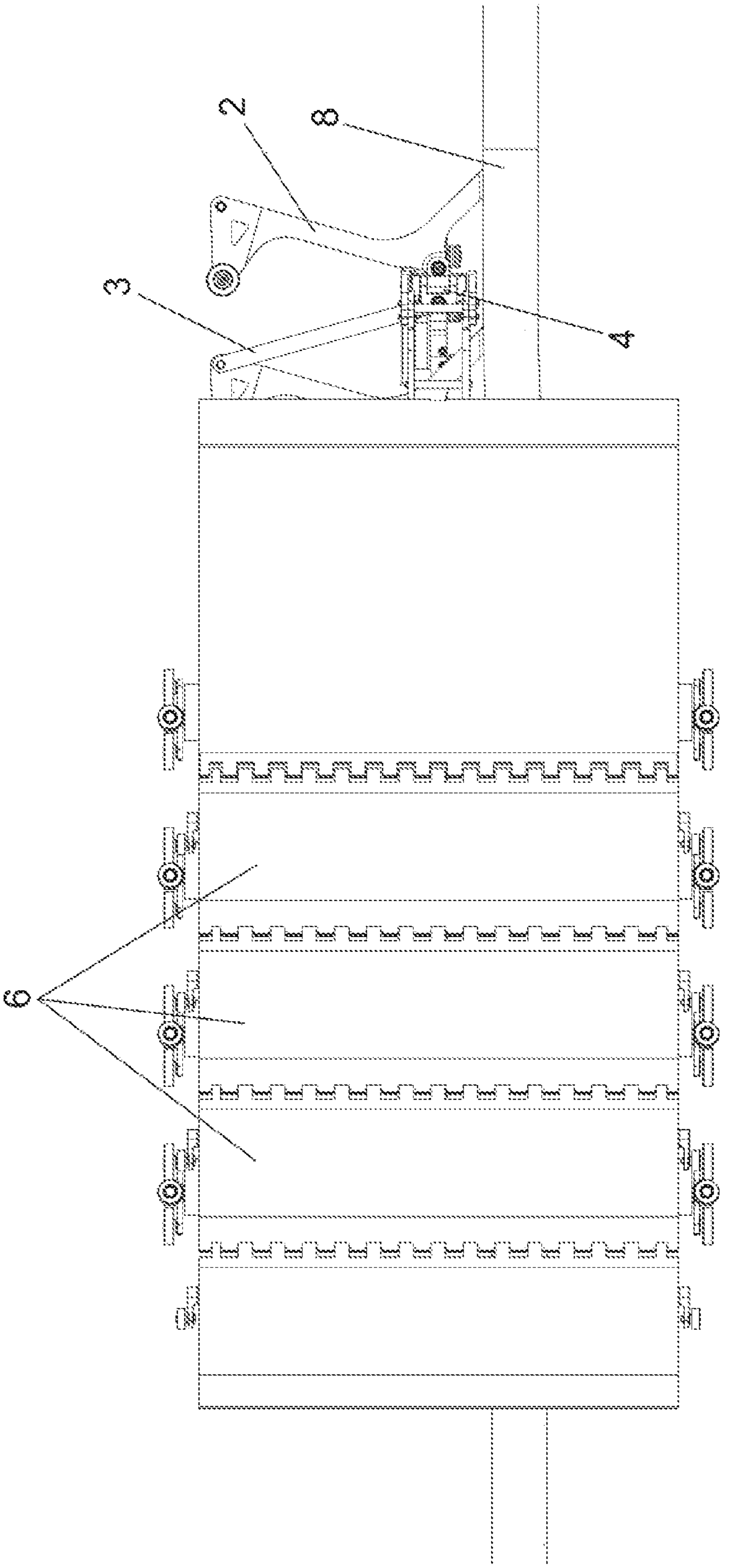
FIG. 5 is a plan view of an example chain.
Figure 6:
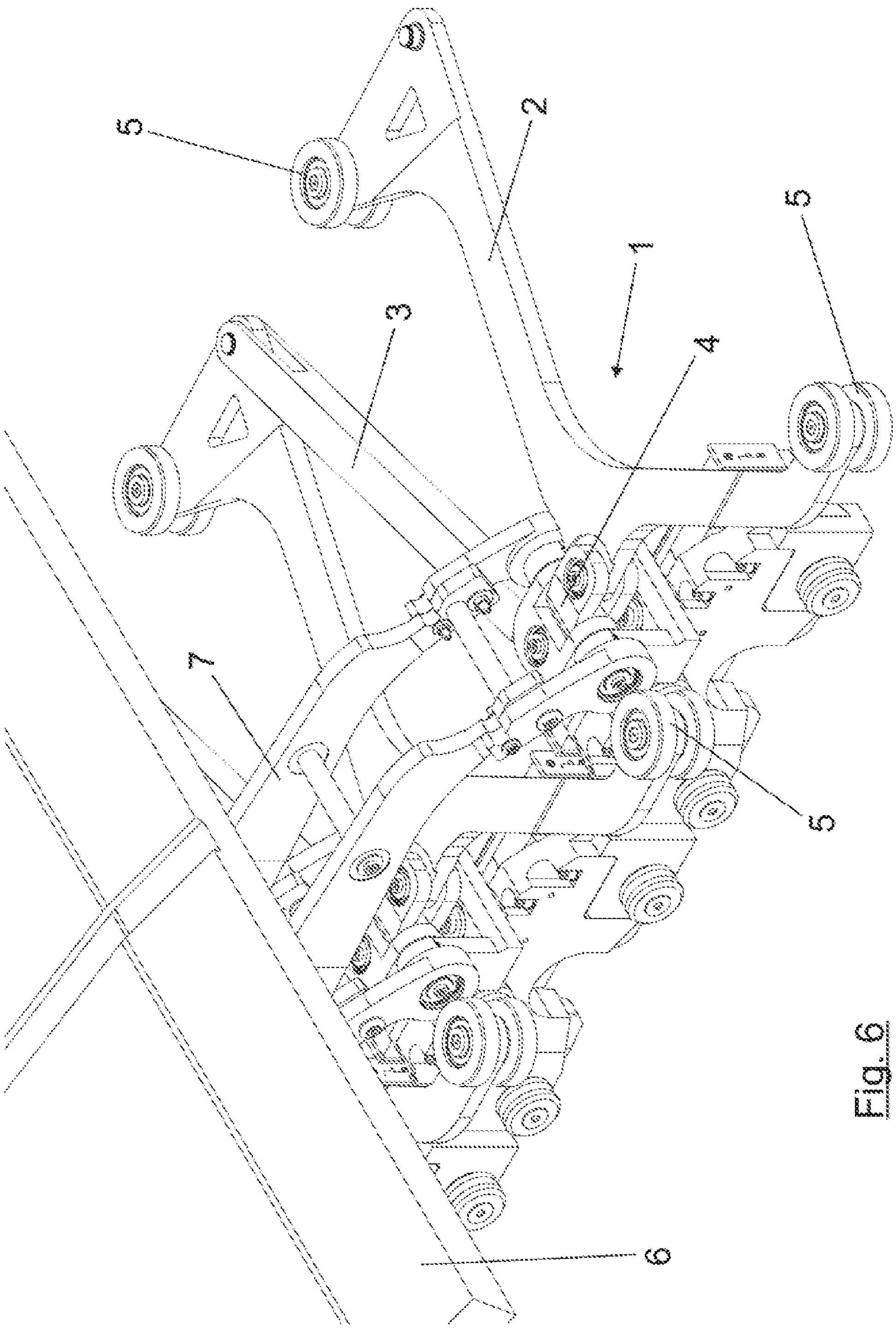
FIG. 6 is a detailed view of example links of an example chain, as well as an example joint disposed at an articulation point.
Figure 7:
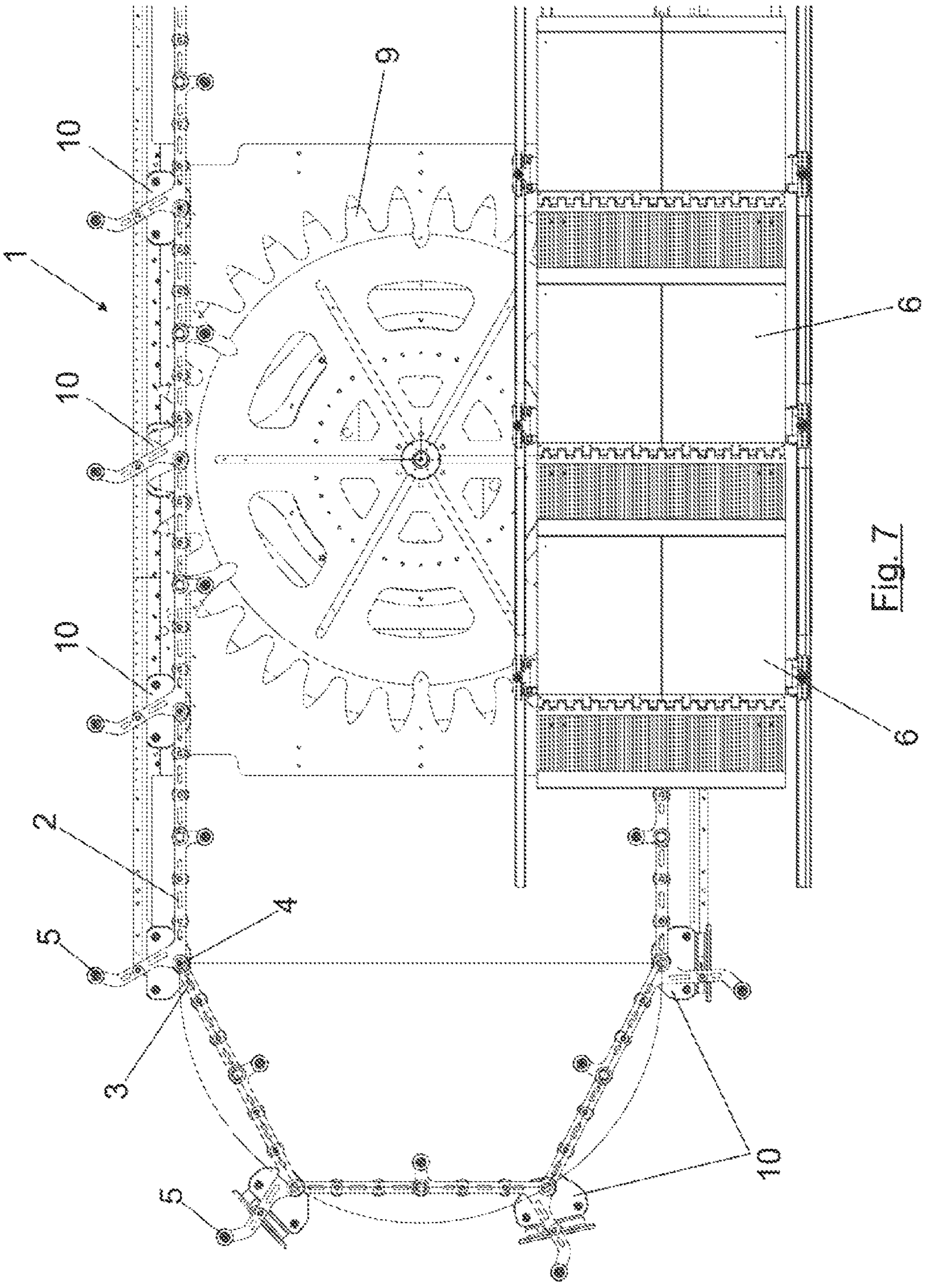
FIG. 7 is a sectional view of an example chain similar to that shown in FIG. 4, wherein the chain includes a pilot wheel.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns platforms and conveyors for transporting people and goods, including conveyors that comprise belts formed by pallets. Likewise, the present disclosure concerns systems that enable the distance between pallets and different degrees of overlap thereof to be varied, which may be necessary for varying speed along a length of the conveyor.

The present disclosure resolves the problems existing in the prior art by way of a safety chain for conveyor pallets, for transporting people and goods. In turn, complex mechanisms for varying the speed of conveyors described in the prior art are removed and replaced with simpler mechanisms and fewer components. To that end, one example objective according to the present disclosure is a safety chain for conveyor pallets for transporting people and goods formed by bent and/or straight links, which may be articulated relative to one another in such a way that it is possible to rotate and change the position of the pallets to increase or decrease the distance between and/or the overlap between the pallets, according to a change in the speed of the conveyor.

This safety chain is formed by bent and straight links. The bent links have a wheel arranged at each end thereof.

The bent and straight links are arranged alternately with one another, i.e. one bent, one straight, one bent, one straight, etc. and each consecutive bent and straight link are joined by an articulation point. Moreover, an aisle pallet is joined to each one of the articulation points by means of an arm.

There are roller guides arranged on one of the two sides of the chain. These roller guides make the same trajectory as the chain and are configured for the wheels at the ends of the bent links to rotate.

This chain configuration means the articulation point enables the rotation and position change of the bent and straight links, in order to thus be able to increase and decrease the distance between the consecutive aisle pallets and the overlap thereof, according to the change in the speed of the aisle. Depending on the position of these links and particularly of the bent ones, the wheel of one of the two ends of each bent link is arranged in the corresponding roller guide thereof.

In accordance with a preferred embodiment of the invention, a drive cart is fixed to the chain at each articulation point. These drive carts are moved along the length of a drive guide, pulled by linear motors. In this way, the drive carts in turn pull the aisle pallets.

Particularly, provided that the chain is fully stretched out, i.e. when the distance between the pallets is at its greatest and there is no overlap between them, said chain may in turn be driven by a pilot wheel coplanar with the same, as an alternative actuating system to the linear motors. If the chain were not completely stretched out and were bent upon being pulled by the actuating wheel, no push would be generated on the pallets, which means that an appropriate movement would not be generated in the chain.

The safety chain object of the present invention may be used both in acceleration aisles in which the turnaround is carried out vertically and in those in which the turnaround is carried out horizontally.

The object of the present invention is a safety chain 1 for aisle pallets 6 for transporting people and goods.

As seen in the figures, the invention is formed by a plurality of bent links 2, which in turn comprise a wheel 5 at each one of the ends thereof and by a plurality of straight links 3. The arrangement of the links is such that the bent links 2 and the straight links 3 are alternated with one another and each consecutive bent link 2 and straight link 3 are joined by an articulation point 4. An aisle pallet 6 is joined by means of an arm 7 to each one of these articulation points 4.

Additionally, there are roller guides 8 that are arranged on one of the two sides of the chain 1. These roller guides 8 make the same trajectory as the one made by the chain 1 and are configured to rotate the wheels 5 on the ends of the bent links 2.

Therefore, the articulation point 4 enables the rotation and position change of the bent links 2 and straight links 3, in order to achieve an increase and decrease in the distance and the overlap distance between the consecutive aisle pallets 6, according to the change in the speed of the aisle. Depending on the position of the bent links 2, the wheel 5 of one of the two ends of each one of the same is arranged in the corresponding roller guide 8 thereof.

A drive cart 10 is preferably fixed at each articulation point 4 of the chain 1. These drive carts 10 are pulled by linear motors and move along the length of a drive guide, which make an independent trajectory to that made by the chain 1. In this way, said drive carts 10 in turn pull the aisle pallets 6. Particularly, the trajectory of the drive guide may be the same as the one made by the chain 1.

In accordance with a particular embodiment of the invention, the chain 1 may additionally be driven in turn by a pilot wheel 9 that is coplanar with said chain 1.

After having explained the invention clearly, it should be noted that the details of the particular embodiments previously described may amended, provided that this does not alter the fundamental principle and essence of the invention.

The invention claimed is:

1. A safety chain for conveyor pallets for transporting at least one of people or goods along a trajectory, the safety chain comprising:

a plurality of bent links, with each of the plurality of bent links having two ends and a wheel disposed at each of the two ends;

a plurality of straight links positioned in alternating fashion with the plurality of bent links along the trajectory of the safety chain, wherein the plurality of bent links are joined to the plurality of straight links at articulation points;

an arm extending from each of the articulation points;

a conveyor pallet coupled to each arm extending from each of the articulation points;

a drive cart disposed at and coupled to each of the articulation points and configured to pull the conveyor pallet, wherein the drive carts are configured to be driven by linear motors and moved along a length of a drive guide that follows the trajectory of the safety chain; and roller guides positioned at one of two sides of the safety chain, wherein the roller guides follow the trajectory of the safety chain, wherein the roller guides are configured to rotate the wheels disposed at the ends of the plurality of bent links, wherein the articulation points enable rotation and position change of the plurality of bent links and the plurality of straight links for increasing or decreasing a distance between consecutive conveyor pallets according to a change in speed of a conveyor comprised of the conveyor pallets, wherein depending on a position of each of the plurality of bent links the wheel at one of the ends of each of the plurality of bent links is disposed in or along one of the corresponding roller guides.

2. The safety chain of claim 1 further comprising a pilot wheel that is coplanar with the safety chain for driving the plurality of bent links, the plurality of straight links, the arms, and the conveyor pallets.

3. The safety chain of claim 1 wherein the roller guides are positioned at only one of the two sides of the safety chain along a majority of a length of the trajectory of the safety chain.

4. The safety chain of claim 1 wherein the roller guides are positioned at only one of the two sides of the safety chain along a majority of the trajectory of the safety chain.

5. The safety chain of claim 1 wherein each of the arms is coupled to at least one of a bent link or a straight link.

6. The safety chain of claim 1 wherein along a length of the safety chain the roller guides are positioned solely at one of two sides of the safety chain.

7. A safety chain for conveyor pallets for transporting at least one of people or goods along a trajectory, the safety chain comprising:

a plurality of bent links, with each of the plurality of bent links having two ends and a wheel disposed at each of the two ends;

a plurality of straight links positioned in alternating fashion with the plurality of bent links along the trajectory of the safety chain, wherein the plurality of bent links are joined to the plurality of straight links at articulation points;

an arm extending from each of the articulation points;

a conveyor pallet coupled to each arm extending from each of the articulation points;

roller guides positioned at one of two sides of the safety chain, wherein the roller guides follow the trajectory of the safety chain, wherein the roller guides are configured to rotate the wheels disposed at the ends of the plurality of bent links; and a pilot wheel that is coplanar with the safety chain and drives the plurality of bent links, the plurality of straight links, the arms, and the conveyor pallets, wherein the articulation points enable rotation and position change of the plurality of bent links and the plurality of straight links for increasing or decreasing a distance between consecutive conveyor pallets according to a change in speed of a conveyor comprised of the conveyor pallets, wherein depending on a position of each of the plurality of bent links the wheel at one of the ends of each of the plurality of bent links is disposed in or along one of the corresponding roller guides.

8. The safety chain of claim 7 wherein the roller guides are positioned at only one of the two sides of the safety chain along a majority of a length of the trajectory of the safety chain.

9. A safety chain with partially overlapping conveyor pallets for transporting at least one of people or goods along a trajectory, the safety chain comprising:

a plurality of bent links, with each of the plurality of bent links having two ends and a wheel disposed at each of the two ends;

a plurality of straight links positioned in alternating fashion with the plurality of bent links along the trajectory of the safety chain, wherein the plurality of bent links are joined to the plurality of straight links at articulation points;

an arm extending from each of the articulation points, with each arm coupled to one of the partially overlapping conveyor pallets at a central area of a lower side of each respective partially overlapping conveyor pallet, wherein the articulation points enable rotation and position changes of the plurality of bent links and the plurality of straight links for increasing and decreasing distances between and overlap of the partially overlapping conveyor pallets according to changes in speed of the partially overlapping conveyor pallets; and roller guides positioned at one of two sides of the safety chain, wherein the roller guides follow the trajectory of the safety chain, wherein the roller guides are configured to rotate the wheels disposed at the ends of the plurality of bent links, wherein, depending on a position of each of the plurality of bent links, the wheel at one of the ends of each of the plurality of bent links is disposed in or along one of the corresponding roller guides.

10. The safety chain of claim 9 wherein the rotation and position changes of the plurality of bent links and the plurality of straight links occur in a plane that is substantially parallel to tread surfaces of the partially overlapping conveyor pallets.

11. The safety chain of claim 9 further comprising a drive cart disposed at each of the articulation points, wherein the drive carts are pulled by linear motors and move along a length of a drive guide that follows the trajectory of the safety chain, wherein the drive carts pull the partially overlapping conveyor pallets.

12. The safety chain of claim 11 further comprising a pilot wheel that is coplanar with the safety chain for driving the plurality of bent links, the plurality of straight links, the arms, and the partially overlapping conveyor pallets.

13. The safety chain of claim 11 wherein the roller guides are positioned at only one of the two sides of the safety chain along a majority of a length of the trajectory of the safety chain.

14. The safety chain of claim 9 further comprising a pilot wheel that is coplanar with the safety chain for driving the plurality of bent links, the plurality of straight links, the arms, and the conveyor pallets.

15. The safety chain of claim 14 wherein the roller guides are positioned at only one of the two sides of the safety chain along a majority of a length of the trajectory of the safety chain.

16. The safety chain of claim 9 wherein the roller guides are positioned at only one of the two sides of the safety chain along a majority of the trajectory of the safety chain.

17. The safety chain of claim 9 wherein each of the arms is coupled to at least one of a bent link or a straight link.

* * * * *